April 23, 1940.  R. C. GRAEF  2,198,337
AIR CONDITIONING MEANS FOR AUTOMOTIVE VEHICLES
Filed Nov. 7, 1938  3 Sheets-Sheet 1
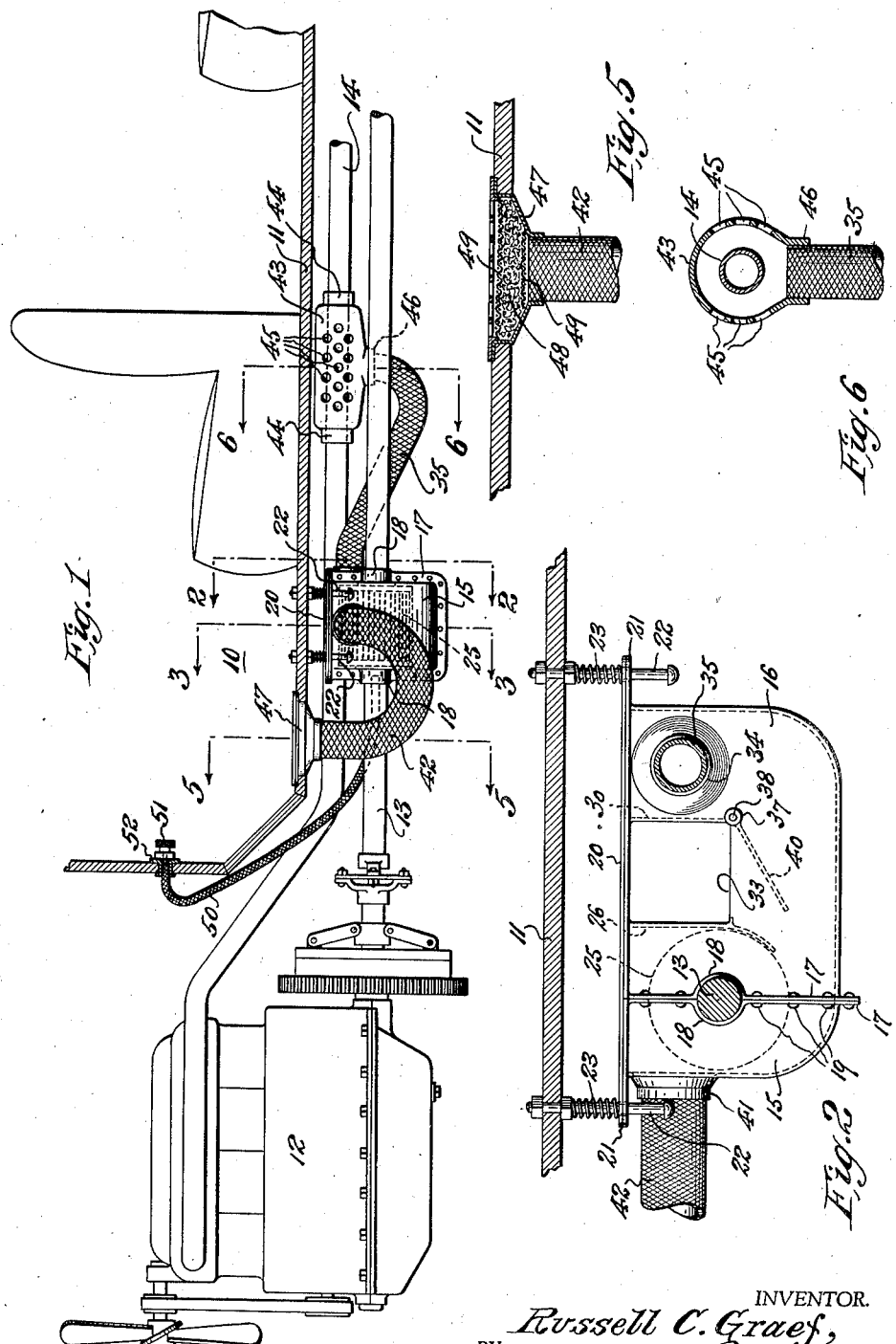
INVENTOR.
Russell C. Graef,
BY George D. Richards
ATTORNEY.

April 23, 1940.                R. C. GRAEF                2,198,337
            AIR CONDITIONING MEANS FOR AUTOMOTIVE VEHICLES
                    Filed Nov. 7, 1938        3 Sheets-Sheet 2

INVENTOR.
Russell C. Graef,
BY George D. Richards
ATTORNEY.

April 23, 1940.  R. C. GRAEF  2,198,337
AIR CONDITIONING MEANS FOR AUTOMOTIVE VEHICLES
Filed Nov. 7, 1938   3 Sheets-Sheet 3

INVENTOR.
Russell C. Graef,
BY George D. Richards
ATTORNEY.

Patented Apr. 23, 1940

2,198,337

UNITED STATES PATENT OFFICE 2,198,337

AIR CONDITIONING MEANS FOR AUTOMOTIVE VEHICLES

Russell C. Graef, Westfield, N. J.

Application November 7, 1938, Serial No. 239,271

4 Claims. (Cl. 98—2)

This invention relates to improved apparatus for conditioning air within the interior of a closed automotive vehicle; and the invention has reference, more particularly, to a very simple means adapted to be actuated by the vehicle engine driven propeller shaft, whereby, in operation, hot or cold air or a proportional mixture of both may be controllably delivered into the interior of a vehicle body.

The invention has for an object to provide an air control chamber arranged to surround a portion of the engine driven propeller shaft of a vehicle, within which chamber is disposed an air impelling fan which is directly affixed to and driven by said propeller shaft when the vehicle is in motion, said chamber having a hot air intake and a cold air intake on the suction side of the fan, with manipulatable valve means to selectively control admission of air through said intakes so that either hot or cold air or a suitable mixture of both is discharged to the vehicle interior from the control chamber through a delivery outlet with which said control chamber is provided and which is located on the discharge side of the fan.

The invention has for a further object to provide means for holding said control chamber in operative relation to the engine driven propeller shaft, and yet subject to movement therewith relative to the vehicle body responsive to the usual spring play between the body and wheels of the vehicle.

The invention has for another object to provide means cooperative with the exhaust line of the vehicle engine for transferring heat from the latter to air which is to be delivered to the hot air intake of the control chamber.

Other objects of this invention, not at this time more particularly enumerated, will be understood from the following detailed description of the same.

Illustrative embodiments of the invention are shown in the accompanying drawings, in which:

Fig. 1 is a fragmentary view in part section, showing portions of the closed body of an automobile, its engine and propeller shaft, and the novel air conditioning means as operatively related thereto; Fig. 2 is a fragmentary transverse sectional view enlarged, taken on line 2—2 in Fig. 1; Fig. 3 is a fragmentary transverse sectional view further enlarged, and taken on line 3—3 in Fig. 1; Fig. 4 is a vertical section taken on line 4—4 in Fig. 3; Fig. 5 is a fragmentary sectional view enlarged of an air delivery register to serve the interior of the automobile body, said section being taken on line 5—5 in Fig. 1; and Fig. 6 is a fragmentary sectional view enlarged of air heating means cooperating with the vehicle engine exhaust line, said view being taken on line 6—6 in Fig. 1.

Similar characters of reference are employed in the above-described views, to indicate corresponding parts.

Figure 3:
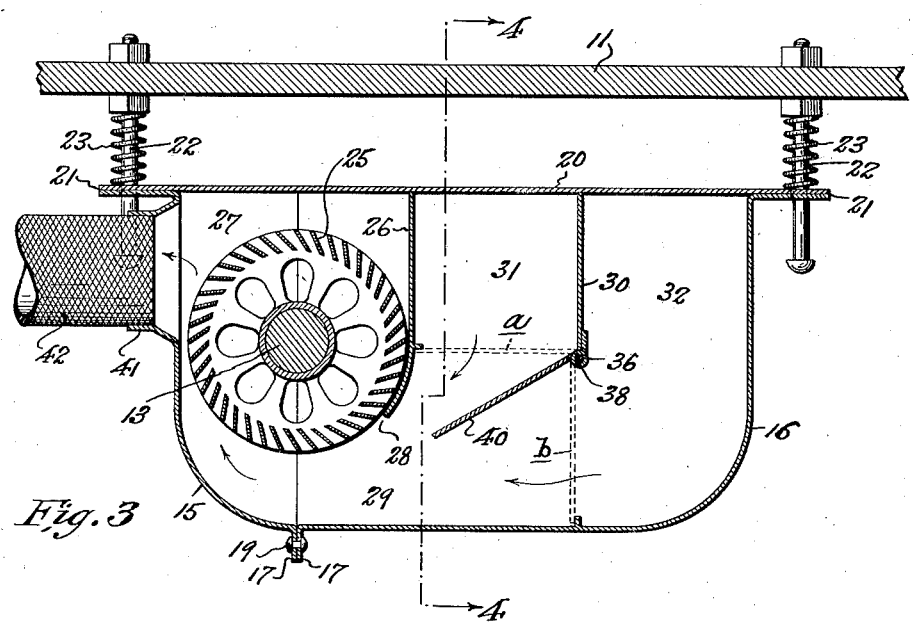
Figure 4:
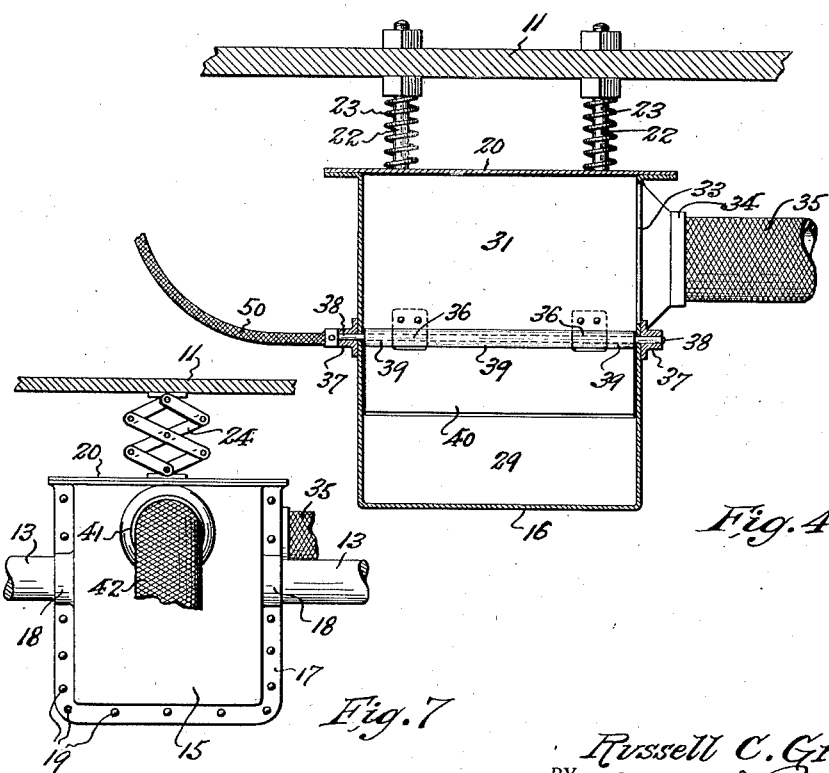
Figure 7:
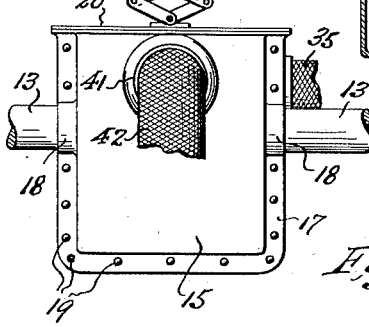
Fig. 7 is a fragmentary elevational view, showing a modified form of means for holding the air control chamber of the apparatus in operative relation to the engine driven propeller shaft and subject to movement therewith relative to the vehicle body responsive to the springing play of the latter.

In the drawings, the reference character 10 indicates the interior and 11 the floor of the closed body of an automotive vehicle; and the reference character 12 indicates the internal combustion engine which drives the propeller shaft 13 for operating the vehicle traction wheels (not shown). The reference character 14 indicates the exhaust pipe of the engine 12, through which the spent hot gases of combustion are discharged in the usual manner.

Figure 8:
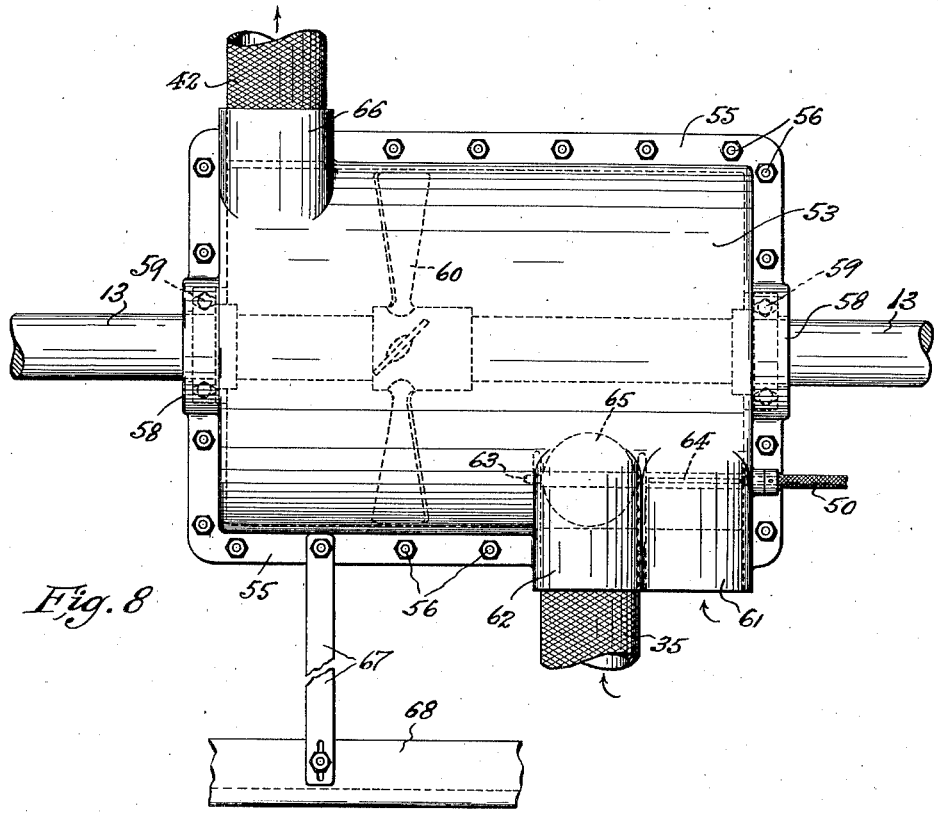
Fig. 8 is a plan view of a modified form and construction of air control chamber.

One illustrative embodiment of this invention, as shown in Figs. 1 to 4 inclusive, comprises an air control chamber formed by casing sections 15 and 16 having meeting flanges 17 and bearing portions 18, whereby said sections may be assembled to embrace the propeller shaft 13, and secured together by suitable fastening means 19 engaged through the meeting flanges 17 of said sections, thus permitting a portion of said propeller shaft 13 to pass through the interior of the chamber. The air chamber casing thus formed is closed at its upper side by a cover or closure plate 20. In the arrangement shown in Figs. 1 to 4, the casing sections 15 and 16 and the end portions of said cover or closure plate are formed to provide outwardly projecting end flanges 21, with which are operatively engaged suspension or holding means for retaining the air chamber against rotative displacement relative to the propeller shaft 13, and yet yieldably supported relative to the vehicle body subject to springing play of the latter relative to the propeller shaft and to the vehicle wheels. One arrangement of such holding means comprises guide studs 22 which are affixed to depend from the vehicle body floor 11 to extend loosely through said end flanges 21, preferably adjacent to the respective corners of the air chamber, cushioning springs 23 being disposed about said studs 22 intermediate the vehicle body floor 11 and the end flanges 21 of the air chamber. An alternative means for yieldably holding the air chamber in operative relation to the propeller shaft 13 is shown in Fig. 8, and comprises one or more lazy-tongs levers connections 24 affixed to and between the vehicle floor 21 and the air chamber.

Affixed upon that portion of said propeller shaft 13 which passes through the interior of the air chamber is an air impeller fan 25, preferably, in the embodiment of the invention now being described, being of the cylindrical vaned type. The air chamber is internally subdivided by a transverse partition 26 to provide a fan housing compartment 27 open at its lower end beneath the intake side of the fan 25, as at 28, and so as to provide an air mixing compartment 29 on the intake side of said fan 25.

The upper interior of said air chamber is further internally divided by a transverse partition 30, to provide on one side thereof a cold air intake compartment 31, and on the other side thereof a hot air intake compartment 32. An exterior wall of the air chamber (preferably a side wall) is cut away contiguous to the cold air intake compartment 31 to provide an intake opening 33 leading thereinto from the atmosphere. Formed in connection with an exterior wall of the air chamber which is contiguous to the hot air intake compartment 32 is an externally projecting tubular neck 34 leading into the latter, and which is adapted to receive coupling connection therewith of a flexible conduit 35 leading from a source of hot air. Rotatably mounted in bearing portions 36 affixed to the free marginal portions of said partition 30, and with its ends journaled in external bearing members 37 affixed to the respective sides of the air chamber, is a spindle 38 upon which are fixed the knuckle elements 39 of a valve plate 40. This valve plate 40 may be swung about its pivotal connection to a position *a* (shown by broken lines in Fig. 3) in which it closes communication between the cold air intake compartment 31 and the air mixing compartment 29 while at the same time opening full communication between the hot air intake compartment 32 and said air mixing compartment 29, or the valve plate may be swung to a position *b* (shown by broken lines in Fig. 3) in which it closes communication between the hot air intake compartment 32 and air mixing compartment 29 while at the same time opening full communication between the cold air compartment 31 and said air mixing compartment 29, or said valve plate may be swung to any selected position intermediate said positions *a* and *b* to thereby admit to said mixing chamber 29 any selected proportional volumes of both cold and hot air.

Formed in connection with an exterior wall of the air chamber in a location to communicate with the fan housing compartment 27 on the discharge side of the fan 25 is an externally projecting tubular neck 41 which is adapted to receive coupling connection therewith of a flexible air discharge conduit 42.

One means for furnishing hot air to the air chamber comprises a heating chamber 43 adapted to be mounted on and to extend around the engine exhaust pipe 14 in spaced relation thereto. Said heating chamber 43 is provided at its ends with neck portions 44 to receive and embrace the exhaust pipe 14, and so as to suitably affix said heating chamber thereto. Formed in the walls of said heating chamber 43 are suitably disposed openings 45 to provide air intake passages in communication with the atmosphere. Formed in connection with said heating chamber 43 is a tubular coupler neck 46 leading outwardly therefrom, and which is adapted to receive coupling connection of said flexible hot air conduit 35 which leads to the hot air intake compartment of the air chamber.

The output of the air control chamber may be delivered through the flexible air discharge conduit 42 to any desired means of communication with the interior 10 of the vehicle body. Illustrative of one such means of communication is the floor register 47 shown in Figs. 1 to 5 to which the conduit 42 is suitably coupled. If desired, this floor register may include, within its chambered interior, a body 48 of fibrous material of any desired character retained between reticulate keeper plates 49. Said body of fibrous material 48 provides an interstitial or porous filter or screening mass adapted to separate from the delivered air, prior to entrance thereof into the vehicle body interior 10, any contained dust or like foreign matter.

Means is provided for actuating the air control damper or valve plate 40 from the interior of the vehicle body. Said means preferably comprises a flexible shaft 50, one end of which is suitably coupled to the spindle 38 of said damper or valve plate 40, and the other end of which is coupled with a manipulating knob 51, or the like, rotatably mounted in a bearing 52 affixed to the instrument board or panel or a wall of the vehicle body.

In operation, when the vehicle, equipped with the novel air conditioning means of this invention, is being driven, the rotation of the propeller shaft 13 is imparted to the fan 25. If it is desired to deliver only heated air to the vehicle body interior, the operator turns the control knob 51 in a direction to transmit through the flexible shaft 50 rotary movement to the spindle 38 adapted to swing the damper or valve plate 40 to position *a* (Fig. 3), thus closing access of cold air from intake compartment 31 to compartment 29, and opening full communication between compartment 29 and the hot air intake compartment 32. The hot air is sucked by the rotating fan from compartment 29 and impelled into the fan compartment 27 whence it is delivered through the conduit 42 through the register 47 into the vehicle body interior. If only cold air is desired, then the operator manipulates the damper or valve plate 40 to dispose the same in position *b* (Fig. 3), thus closing access of hot air from the intake compartment 32 to compartment 29, and opening full communication between compartment 29 and the cold air intake compartment 31, whereupon the fan 25 delivers the cold air to the register 47. If desired, air of desired modified temperature between the cold and hot may be easily obtained by setting the damper or valve plate 40 in desired adjusted intermediate position between positions *a* and *b* (Fig. 3), thus admitting both hot and cold air, in desired relative proportions, into the mixing compartment 29, to be thence taken by the fan 25 and discharged to the register 47 for admission into the vehicle body interior.

It will be obvious that a very simple and effective air conditioning means is provided by the apparatus of this invention, wherein the device is fully mechanical, deriving its operating power directly from the engine driven propeller shaft, thus avoiding electrical circuits, electrical motors and further drains on storage battery equipment involved in the case of the latter. The instant apparatus is comparatively inexpensive to manufacture and install, and occupies but little room beneath the car so as not to encroach on required road clearance. The air control chamber may be made of sheet metal, or may be formed from castings as desired.

Figure 9:
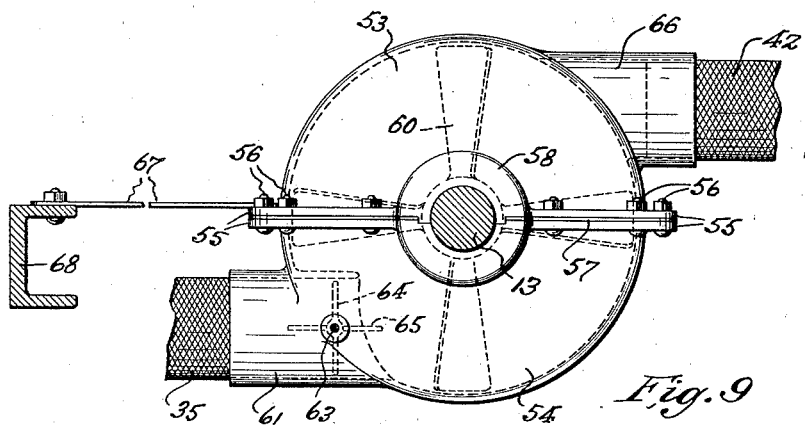
Fig. 9 is an end elevation of the same viewed from the right in Fig. 8.

In Figs. 8 and 9 of the drawings, there is shown a somewhat modified form of air control chamber and component parts, which nevertheless embodies the principles of the instant invention. In this modified structure, the air chamber is formed by a cylindrical casing made in longitudinally split half-sections 53 and 54 having marginal meeting flanges 55 secured together by bolts 56, or other suitable fastening means, so that a sealing gasket 57 may be interposed therebetween if desired. The end walls of said casing sections are provided with bearing hubs 58 internally cored to receive and seat antifriction bearings 59. Said casing is assembled about the engine driven propeller shaft 13, so that the latter extends longitudinally or axially therethrough and through the antifriction bearings 59. Affixed upon the propeller shaft is a pitched blade fan member 60 positioned within and across the interior of the air chamber intermediate its ends, thus providing an air intake and mixing compartment on the suction side of said fan and an air discharge compartment on the delivery side of said fan.

Formed in connection with the casing sections 53—54 are laterally projecting air intake means, comprising a cold air intake 61 open to the atmosphere and a hot air intake 62 with which the hot air delivery conduit 35 is suitably coupled. Said intakes 61 and 62 communicate with the air intake and mixing compartment provided on the suction side of the fan member 60. Rotatably mounted to extend transversely across both the cold and hot air intakes 61 and 62 is a spindle 63 to the outer end of which is operatively connected the flexible actuating shaft 50. Affixed on said spindle 63 to cooperate with the cold air intake 61 is a valve plate or damper 64, and, in like manner, affixed on said spindle 63 to cooperate with the hot air intake 62 is a valve plate or damper 65. These dampers or valve plates 64 and 65 are set relatively at angular relations ninety degrees apart, so that when one is fully closed the other is fully open, but so as to be capable, when rotated, of being disposed in positions intermediate open and closed positions so as to admit cold and hot air in desired relative proportions for mixture to produce discharged air of desired modified temperature between cold and hot.

Formed in connection with the casing sections 53—54 is a laterally projecting air discharge means 66 leading from the air discharge compartment on the delivery side of said fan member 60. The air discharge conduit 42 is suitably coupled in communication with said discharge means 66.

The air control chamber provided by the assembled casing sections 53—54 is retained against rotary displacement relative to the propeller shaft 13, and yet free to move therewith relative to the vehicle body as supported by its springing connection with the vehicle traction wheels, by means of a flexible spring steel retaining arm 67 which is anchored by one end to the casing sections and by its other end to the chassis framework 68 of the vehicle.

It will be obvious that the operation and use of the last described modified form of the novel air control chamber and cooperating elements of the system is the same as that set forth in connection with the structure first above described.

As many changes could be made in the above described constructions and many apparently widely different embodiments of this invention could be made without departing from the scope thereof, as defined by the following claims, it is intended that all matter contained in the above description or shown in the accompanying drawings shall be interpreted as illustrative and not in a limiting sense.

I claim:

1. In an automotive vehicle having a closed body, in combination with the engine operated propeller shaft which drives the vehicle traction wheel axles, a hollow casing to provide an air control chamber through which said propeller shaft extends, means interconnected between the vehicle body and said casing for holding the latter against rotation, said holding means being adapted to yield to vehicle body movement relative to said propeller shaft, an air impeller fan fixed on and driven by said shaft within said chamber, said chamber having a cold air intake means and a hot air intake for communication with the suction side of the fan, a single pivoted damper means intermediate said cold and hot air intake means and manipulatable for selective cooperation therewith to admit either hot or cold air or both into said control chamber, means connected with said chamber in communication with the discharge side of the fan to deliver air therefrom into the vehicle body interior, and means for supplying heated air to said hot air intake of the control chamber.

2. In an automotive vehicle having a closed body, in combination with the engine operated propeller shaft which drives the vehicle traction wheel axles, a hollow casing to provide an air control chamber through which said propeller shaft extends, means interconnected between the vehicle body and said casing for holding the latter against rotation, said holding means being adapted to yield to vehicle movement relative to said propeller shaft, an air impeller fan fixed on and driven by said shaft within said chamber, said chamber having a cold air intake means and a hot air intake for communication with the suction side of the fan, a single pivoted damper means intermediate said cold and hot air intake means and manipulatable for selective cooperation therewith to admit either hot or cold air or both into said control chamber, means connected with said chamber in communication with the discharge ends of the fan to deliver air therefrom into the vehicle body interior, an air heater jacketing the vehicle engine exhaust pipe, said heater having air admission means, and means of communication between said heater and said hot air intake of the control chamber.

3. In an automotive vehicle having a closed body, in combination with the engine operated propeller shaft which drives the vehicle traction wheel axles, a hollow casing to provide an air control chamber through which said propeller shaft extends, means interconnected between the vehicle body and said casing for holding the latter against rotation, said holding means being adapted to yield to vehicle body movement relative to said propeller shaft, an air impeller fan fixed on and driven by said shaft within said chamber, said chamber having a cold air intake means and a hot air intake means for communication with the suction side of the fan, a single pivoted damper means intermediate said cold and hot air intake means and manipulatable for selective cooperation therewith to admit either hot or cold air or both into said control chamber, means connected with said damper means manipulatable from within the vehicle body for swinging said damper means to a selected position, flexible conduit means connected with said chamber in communication with the discharge side of said fan for delivering discharged air into the vehicle body interior, and means for supplying heated air to said hot air intake of the control chamber.

4. In an automotive vehicle having a closed body, in combination with the engine operated propeller shaft which drives the vehicle traction wheel axles, a hollow casing to provide an air control chamber through which said propeller shaft extends, means interconnected between the vehicle body and said casing for holding the latter against rotation, said holding means being adapted to yield to vehicle body movement relative to said propeller shaft, an air impeller fan fixed on and driven by said shaft within said chamber, said chamber having a cold air intake means and a hot air intake means for communication with the suction side of the fan, a single pivoted damper means intermediate said cold and hot air intake means and manipulatable for selective cooperation therewith to admit either hot or cold air or both into said control chamber, means connected with said damper means manipulatable from within the vehicle body for swinging said damper means to a selected position, flexible conduit means connected with said chamber in communication with the discharge side of said fan for delivering discharged air into the vehicle body interior, an air heater jacketing the vehicle engine exhaust pipe, said heater having air admission means, and flexible conduit means providing communication between said heater and said hot air intake of the control chamber.

RUSSELL C. GRAFF.